April 11, 1961 A. J. DWYER 2,979,338
GAME CART
Filed May 8, 1959 2 Sheets-Sheet 1
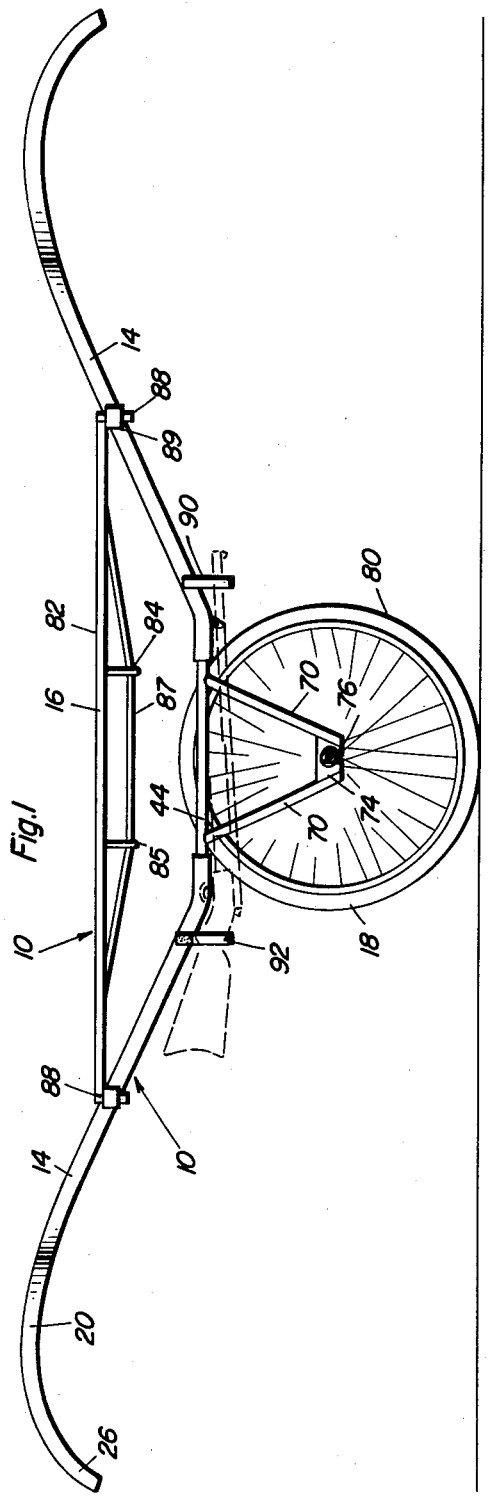
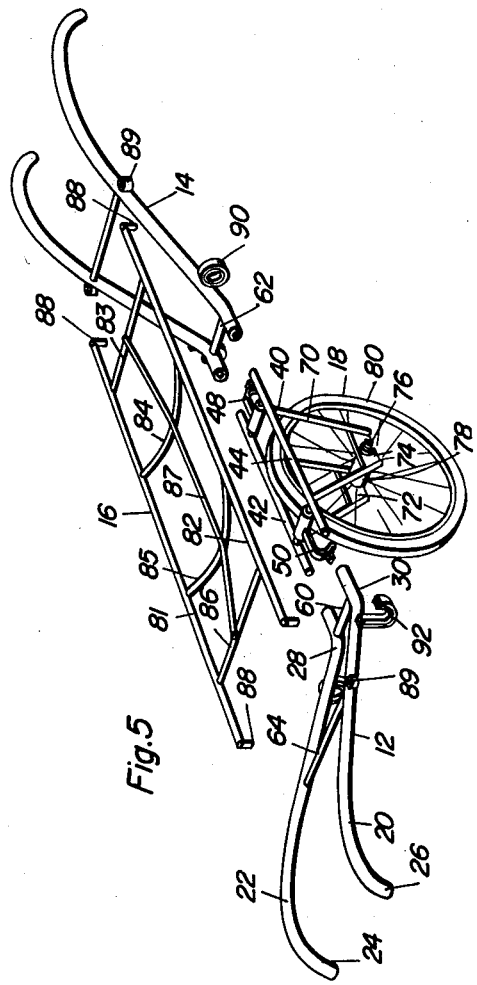
Arthur J. Dwyer
INVENTOR.

April 11, 1961 A. J. DWYER 2,979,338
GAME CART
Filed May 8, 1959 2 Sheets-Sheet 2
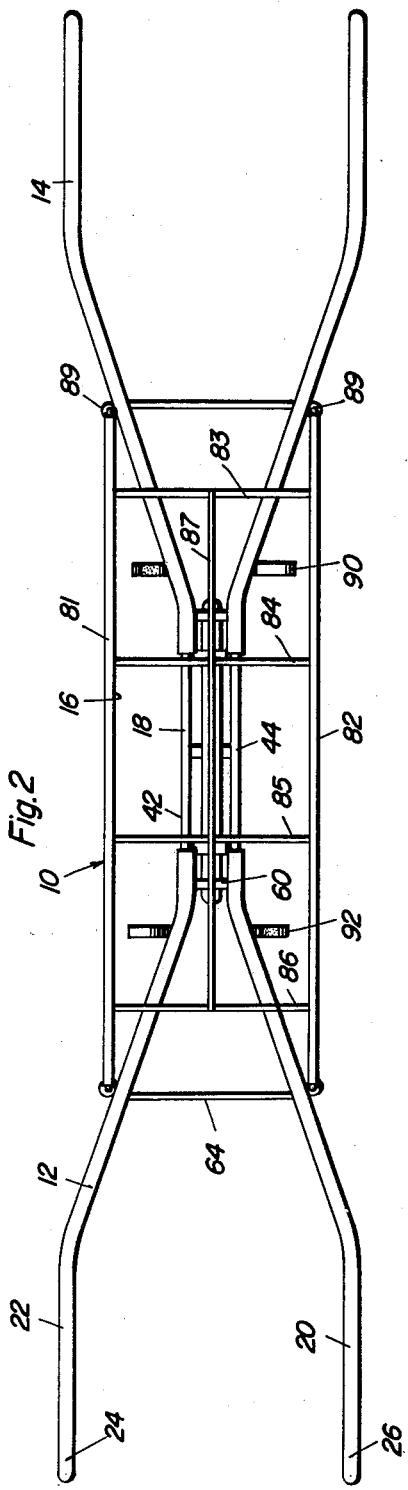
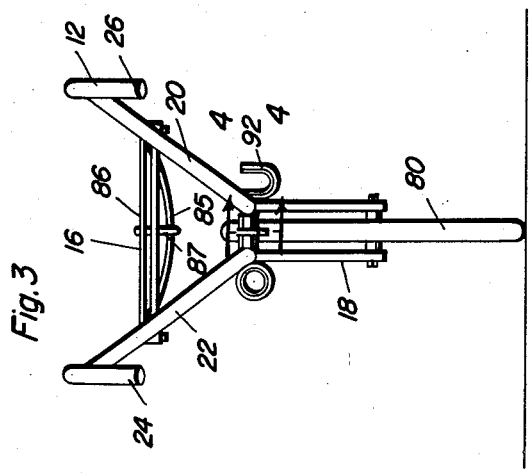
Arthur J. Dwyer
INVENTOR.
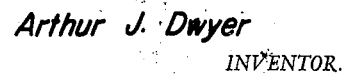

United States Patent Office 2,979,338
Patented Apr. 11, 1961

2,979,338

GAME CART

Arthur J. Dwyer, Box 494, McLean, Tex.

Filed May 8, 1959, Ser. No. 811,857

10 Claims. (Cl. 280—47.3)

This invention relates to a game cart and more particularly to a carriage for transporting game such as deer.

An object of the invention is to provide a convenient, lightweight and easily used cart which may be assembled and disassembled very promptly and without tools. The cart is preferably of the single wheel type and has a cradle on which the load, for example a deer, rests with the center of gravity of the deer passing directly through the axis of rotation of the single wheel to facilitate maneuvering of the loaded cart.

An important feature of the invention is the way in which the cart is easily assembled and disassembled. The cart consists of four major sections which require only the manipulation of three different types of connection means for completely assembling or disassembling the cart.

The construction of the cart is such that two men may easily handle a deer, completely transporting the deer from within the woods. One man pushes while the other pulls, and the weight of the deer is carried by the single wheel located between the front and rear men. There are means connected with the cart for retaining in a safe and secure manner the rifles of the hunters whose deer are being transported by the cart.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a cart constructed in accordance with the invention.

Figure 2 is a top view of the cart in Figure 1.

Figure 3 is an end view of the cart in Figure 1.

Figure 4 is an enlarged fragmentary sectional view taken on the line 4—4 of Figure 3.

Figure 5 is an exploded perspective view of the cart.

In the accompanying drawings there is a cart 10 constructed to exemplify the principles of the invention. This cart is made of only four sections 12, 14, 16 and 18 respectively. Sections 12 and 14 are identical for all practical purposes. Section 12 has a pair of handle bars 20 and 22 which have slightly downwardly curved handle grip ends 24 and 26 and which converge as they approach their inner ends 28 and 30. The inner ends are parallel for a short distance and they are hollow to form sockets within which parts of section 18 are received.

Section 18 is composed of a frame 40 having a pair of upper frame members 42 and 44 which are parallel to each other and held in parallel relationship by means of transverse spacers 46. The spacers are preferably cylindrical and function as hinge pins on which hinged clamps 48 and 50 are mounted for oscillatory movement. Typical clamp 50 is shown in Figure 4 and consists of a sleeve 52 mounted for movement on spacer 42 and having a hook 54 at its outer end. The shank 56 whose end is formed into hook 54, is made of spring metal and is welded or otherwise secured to sleeve 52. The purpose of clamps 48 and 50 is to engage transverse braces 60 and 62 which are attached to the inner ends, for instance ends 28 and 30, of the handle bars 20 and 22. Additional transverse braces 64 extending across the same handle bars are applied where required.

Frame 40 also includes four depending members 70 which are secured to frame members 42 and 44 and which converge. Bearing plates 72 and 74 are welded or otherwise secured to the lower ends of frame members 70, and they support wheel axle 76. The wheel axle extends through bearings in the hub 78 of wheel 80 thereby mounting the wheel for rotation between the sides of frame 40.

Section 16 is a cradle having a pair of side members 81 and 82 held parallel by means of transverse braces 83, 84, 85 and 86. The transverse braces 83 and 86 are at the ends of the group of braces and they are straight. Transverse braces 84 and 85 are downwardly curved to form a seat within which to accommodate the animal. A longitudinal stringer 87 is spot-welded or otherwise secured to all of the braces and extends along a longitudinal center line of the cradle.

There are four downwardly projecting pins 88 at the ends of the cradle side members 81 and 82 and these are detachably received in four sockets 89 which are welded or otherwise secured to the bars or sides of sections 12 and 14. In assembly and disassembly of section 16, pins 88 are engaged or disengaged from sockets 89. When the pins are in sockets 89 the cradle section 16 lends support and rigidity to the entire cart.

Gun supports are on opposite sides of the cart. Each gun support is made of a padded ring 90 and an upwardly opening padded hook 92. One ring is secured to section 14 and one hook 92 is secured to section 12. A second pair consisting of a ring and hook identical to ring 90 and hook 92 are alternately disposed on sections 14 and 12, respectively, so that the rifles of the hunters are supported on opposite sides of the cart.

In use the cart may be pushed and pulled by two men. In an emergency or even under certain normal operating conditions one man may simply push the cart in wheelbarrow fashion.

To assemble the cart attention is invited to Figure 5. Sections 12 and 14 are engaged with the frame 40 by slipping the ends of frame members 42 and 44 in the sockets formed at the inner ends of the sides or bars of sections 12 and 14. When the cradle is attached to sections 12 and 14 by engaging pins 88 in sockets 89 the entire cart is rigidified and made strong and durable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a manual knock-down type game cart comprising a ground engaging wheel, a wheel mounting section, and a handle bar section separably secured to said wheel mounting section, said wheel mounting section including a frame having substantially vertical members permanently connected at their upper ends by elongated bar means and means connected between said wheel and vertical members for mounting said wheel for rotation in said frame, said handle section including an elongated handle having inner and outer end portions, said handle having a longitudinally extending socket in said inner end portion, said elongated bar means rigidly secured to said vertical members and extending substantially horizontally relative to said vertical members, a transverse hinge pin disposed on said bar means adjacent one end thereof, a transverse bearing shaft disposed on said handle adjacent said socket, said one end of said bar means being telescopically and removably inserted in said socket, and a readily releasable clamp in substantial radial alignment with the wheel and pivotally mounted on said hinge pin and removably engaging said bearing shaft so as to releasably retain said handle in a fixed position on said bar means.

2. The combination of claim 1, wherein said clamp is composed primarily of bent sheet metal and includes a shank having a sleeve on one end and a hook on the other end, said sleeve being rotatably journaled on said hinge pin, said hook releasably engaging said bearing shaft.

3. A game cart as recited in claim 1 wherein the wheel section and handle bar section each have two symmetrical sides connected by the hinge pin and bearing shaft respectively.

4. The combination of claim 1, including a second handle bar section having a second elongated handle terminating in inner and outer end portions, said second handle having a longitudinally extending socket telescopically and removably receiving the other end of said elongated bar, a second hinge pin disposed on said bar adjacent said other end, said second handle having a second transverse bearing member disposed adjacent the socket therein and a second clamp in substantial radial alignment with the wheel pivotally mounted on said second hinge pin, said clamp releasably engaging said second transverse member to releasably retain said second handle on said bar.

5. The combination of claim 4, including an animal bearing cradle and means connected between said handle bar sections and said cradle for separably securing the cradle to said handle bar sections and increasing the rigidity of the handles.

6. A game cart as recited in claim 4 wherein a game carrying cradle extends between and is connected to the two handle bar sections whereby the rigidity of the handles is increased.

7. The combination of claim 5 wherein the last mentioned means comprise mating pin and sockets whose axes extend substantially vertically whereby the cradle may be lifted vertically from the cart without disturbing the contents of the cradle.

8. In a manual knock-down type game cart comprising a ground engaging wheel, an elongated wheel mounting section, a pair of handle bar sections, each handle bar section being separably connected to an opposite end of said wheel mounting section and extending longitudinally therefrom, and an animal bearing cradle separably connected to said handle bar sections, each of said handle bar sections having a pair of transversely spaced elongated handles, each of said handles carrying intermediate its ends a socket member, and a pair of connecting pins on each end of said cradle transversely spaced from each other, said pins each being removably inserted in one of said sockets.

9. A game cart as recited in claim 8 wherein the elongated handles of each pair diverge outwardly.

10. A device as recited in claim 8 wherein each handle bar section carries a support for one end of a rifle whereby a rifle can be extended between the supports longitudinally of the game cart.

References Cited in the file of this patent

UNITED STATES PATENTS

| 1,187,781 | Penney et al. | June 20, 1916 |
| 1,895,992 | Hepburn | Jan. 31, 1933 |
| 2,416,492 | Neeley | Feb. 25, 1947 |
| 2,546,604 | Lafky | Mar. 27, 1951 |
| 2,811,367 | Goodale | Oct. 29, 1957 |
| 2,918,296 | Goodale | Dec. 22, 1959 |

FOREIGN PATENTS

| 462,621 | Canada | Jan. 24, 1950 |
| 1,155,562 | France | Dec. 2, 1957 |
| 1,157,626 | France | Dec. 30, 1957 |
| 4,968 | Great Britain | of 1913 |
| 324,920 | Great Britain | Feb. 5, 1930 |